(12) United States Patent
Border et al.

(10) Patent No.: US 8,359,405 B1
(45) Date of Patent: Jan. 22, 2013

(54) PERFORMANCE ENHANCING PROXY AND METHOD FOR ENHANCING PERFORMANCE

(76) Inventors: John Border, Poolesville, MD (US); Matthew Butehorn, Mt. Airy, MD (US)

(*) Notice: Subject to any disclaimer, the term of this patent is extended or adjusted under 35 U.S.C. 154(b) by 1926 days.

(21) Appl. No.: 09/662,072

(22) Filed: Sep. 14, 2000

Related U.S. Application Data

(60) Provisional application No. 60/220,026, filed on Jul. 21, 2000, provisional application No. 60/185,553, filed on Feb. 28, 2000.

(51) Int. Cl.
*G06F 15/16* (2006.01)
(52) U.S. Cl. .................................. 709/246
(58) Field of Classification Search .......... 709/224–227, 709/232, 237–239, 246
See application file for complete search history.

(56) References Cited

U.S. PATENT DOCUMENTS

| | | | | |
|---|---|---|---|---|
| 5,729,544 | A | | 3/1998 | Lev et al. ............... 370/352 |
| 5,892,903 | A | * | 4/1999 | Klaus ..................... 713/201 |
| 6,023,456 | A | | 2/2000 | Chapman et al. .......... 370/252 |
| 6,167,438 | A | * | 12/2000 | Yates et al. ............. 709/216 |
| 6,324,582 | B1 | | 11/2001 | Sridhar et al. ........... 709/230 |
| 6,466,976 | B1 | * | 10/2002 | Alles et al. ............. 709/224 |
| 6,519,651 | B1 | * | 2/2003 | Dillon .................. 709/250 |
| 6,590,885 | B1 | * | 7/2003 | Jorgensen .............. 370/338 |
| 6,640,248 | B1 | * | 10/2003 | Jorgensen .............. 709/226 |
| 6,721,333 | B1 | * | 4/2004 | Milton et al. ........... 370/469 |
| 6,820,133 | B1 | * | 11/2004 | Grove et al. ............ 709/238 |
| 6,822,955 | B1 | * | 11/2004 | Brothers et al. ......... 370/389 |
| 6,823,387 | B1 | * | 11/2004 | Srinivas ................ 709/227 |

FOREIGN PATENT DOCUMENTS

| | | |
|---|---|---|
| EP | 0 903 905 A2 | 3/1999 |
| FR | 2 778 804 | 11/1999 |
| WO | WO 95/34153 | 12/1995 |
| WO | WO 97/20413 | 5/1997 |
| WO | WO 98/39890 | 11/1998 |
| WO | WO 99/31855 | 6/1999 |
| WO | WO 99/66736 | 12/1999 |
| WO | WO 00/60826 | 10/2000 |

* cited by examiner

*Primary Examiner* — Hussein A. Elchanti
(74) *Attorney, Agent, or Firm* — Potomac Technology Law, LLC

(57) ABSTRACT

Method and apparatus for enhancing the performance of a network. The performance enhancing functions described are applicable to a wide variety of communication links, including both slow and fast links, high latency links, and links with low and high error rates. The performance enhancing functions, which may be implemented either singly or in combination, include selective spoofing which allows flexible configuration of which connections should be spoofed, spoofing of the conventional TCP three-way handshake, local data acknowledgement, which allows data windows to increase at local speeds, multiplexing multiple connections across a single connection, data compression/encryption, prioritization, and path selection. The performance enhancing features described are particularly useful for links with high latency and/or high bit error rates.

53 Claims, 5 Drawing Sheets

PERFORMANCE ENHANCING PROXY AND METHOD FOR ENHANCING PERFORMANCE

CROSS-REFERENCE TO RELATED APPLICATIONS

This application claims the benefit under 35 U.S.C. §119 (e) of U.S. Provisional Application of John Border et al. entitled "Enhanced TCP Spoofing", Ser. No. 60/185,553, filed on Feb. 28, 2000, and a U.S. Provisional Application of John Border et al. entitled "Performance Enhancing Proxy", Ser. No. 60/220,026, filed on Jul. 21, 2000, the entire contents of both are incorporated by reference herein.

The present application is also related to co-pending application in the name of Matt Butehorn et al., entitled "Selective Spoofer and Method of Performing Selective Spoofing", filed concurrently herewith.

BACKGROUND OF THE INVENTION

The present invention is generally directed to a method and apparatus for improving the performance of protocols on network paths, and more particularly, a method and apparatus for improving the performance of the TCP/IP protocol on the Internet, utilizing a performance enhancing proxy.

DESCRIPTION OF THE RELATED ART

The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 1. As illustrated, the link layer (or the network interface layer) 10 includes device drivers in the operating system and any corresponding network interface cards. Together, the device driver and the interface cards handle hardware details of physically interfacing with any cable or whatever type of media is being used. The network layer (also called the Internet layer) 12 handles the movement of packets around the network. Routing of packets, for example, takes place at the network layer 12. IP, Internet control message protocol (ICMP), and Internet group management protocol (IGMP) may provide the network layer in the TCP/IP protocol suite. The transport layer 14 provides a flow of data between two hosts, for the application layer 16 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 16 into appropriately sized chunks for the network layer 12 below, acknowledging received packets, setting timeouts to make certain the other end acknowledges packets that are sent, and so on. Because this reliable flow of data is provided by the transport layer 14, the application layer 16 can ignore these details. UDP, on the other hand, provides a much simpler service to the application layer 16. UDP just sends packets of data called datagrams from one host to another, but there is no guarantee that the datagrams reach the other end. Any desired reliability must be added by the application layer 16.

The application layer 16 handles the details of the particular application. There are many common TCP/IP applications that almost every implementation provides. These include telnet for remote log-in, the file transfer protocol (FTP), the simple mail transfer protocol (SMTP) or electronic mail, the simple network management protocol (SNMP), and many others.

As described above, TCP provides reliable, in-sequence delivery of data between two IP hosts. The IP hosts set up a TCP connection, using a conventional TCP three-way handshake and then transfer data using a window based protocol with the successfully received data acknowledged. FIG. 2 illustrates an example of the conventional TCP three-way handshake between IP hosts 20 and 22. First, the IP host 20 that wishes to initiate a transfer with IP host 22, sends a synchronize (SYN) signal to IP host 22. The IP host 22 acknowledges the SYN signal from IP host 20 by sending a SYN acknowledgement (ACK). The third step of the conventional TCP three-way handshake is the issuance of an ACK signal from the IP host 20 to the IP host 22. IP host 22 is now ready to receive the data from IP host 20 (and vice versa). After all the data has been delivered, another handshake (similar to the described to initiate the connection) is used to close the TCP connection.

TCP was designed to be very flexible and works over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together are spaced apart, local TCP ACKs, local TCP retransmissions, TCP ACK filtering and reconstruction. Other PEP mechanisms include tunneling, compression, and priority-based multiplexing.

SUMMARY OF THE INVENTION

The present invention is directed to a method and apparatus for enhancing the performance of a network.

The performance enhancing functions of the present invention are applicable to a wide variety of communication links, including both slow and fast links, high latency links, and links with low and high error rates.

The performance enhancing functions, which may be implemented either singly or in combination include:

selective TCP spoofing which allows flexible configuration of which connections should be spoofed;
spoofing of the conventional TCP three-way handshake;
local data acknowledgement, which allows data windows to increase at local speeds;
multiplexing multiple connections across a single connection which increases acknowledgement traffic reduction and provides a backbone connection protocol optimized for the particular backbone link being used;
data compression/encryption;
prioritizing access to the link; and
selecting a particular path for the data accompanying a connection to take.

DETAILED DESCRIPTION OF THE PREFERRED EMBODIMENTS

Figure 3:
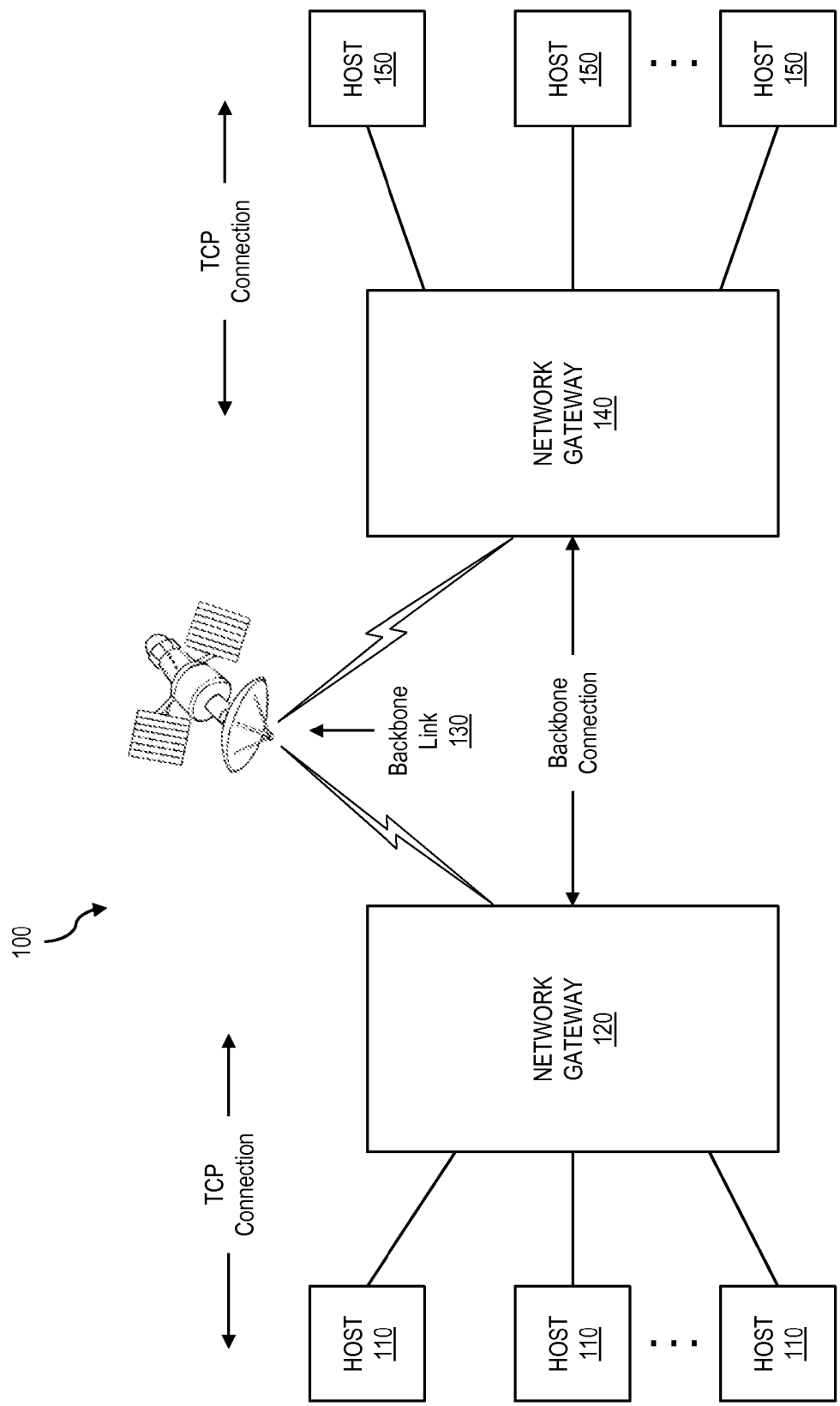
FIG. 3 illustrates an exemplary network in which the performance enhancing proxy (PEP) of the present invention is implemented.

FIG. 3 illustrates an exemplary network 100 in which the performance enhancing proxy (PEP) of the present invention may be utilized. The network 100 in FIG. 3 includes a plurality of hosts 110 connected to a network gateway 120 via TCP connections. The network gateway 120 is connected to another network gateway 140 via a backbone connection on a backbone link 130. In FIG. 3, the backbone link 130 is depicted as a satellite link, however this is only exemplary. The network gateway 140 is further connected to a second group of hosts 150, also via TCP connections. In the arrangement illustrated in FIG. 3, the network gateways 120, 140 facilitate communication between the groups of hosts 110, 150. The network gateways 120, 140 facilitate communication between the two groups of hosts 110, 150 by performing the following performance enhancing functions, either singly or in combination;

selective TCP spoofing which allows flexible configuration of which TCP connections should be spoofed;
spoofing of the conventional TCP three-way handshake, with the TCP connections terminated at each end of the backbone link 130;
local data acknowledgement, allowing TCP windows to increase at local speeds;
multiplexing multiple TCP connections across a single backbone connection which provides the following benefits,
    increased acknowledgement traffic reduction with data from multiple TCP connections acknowledged by a single backbone connection acknowledgement,
    support for high throughput TCP connections using a backbone connection protocol optimized for the particular backbone link being used;
compression of data sent over the backbone link 130 to reduce the amount of traffic to be sent, further leveraging the capabilities of the backbone connection;
encryption of data sent over the backbone link 130 to protect data privacy;
prioritized access to backbone link 130 capacity on a per TCP connection basis; and
selecting a particular path for the data accompanying a connection to take.

These features are described in more detail below.

Figure 4:
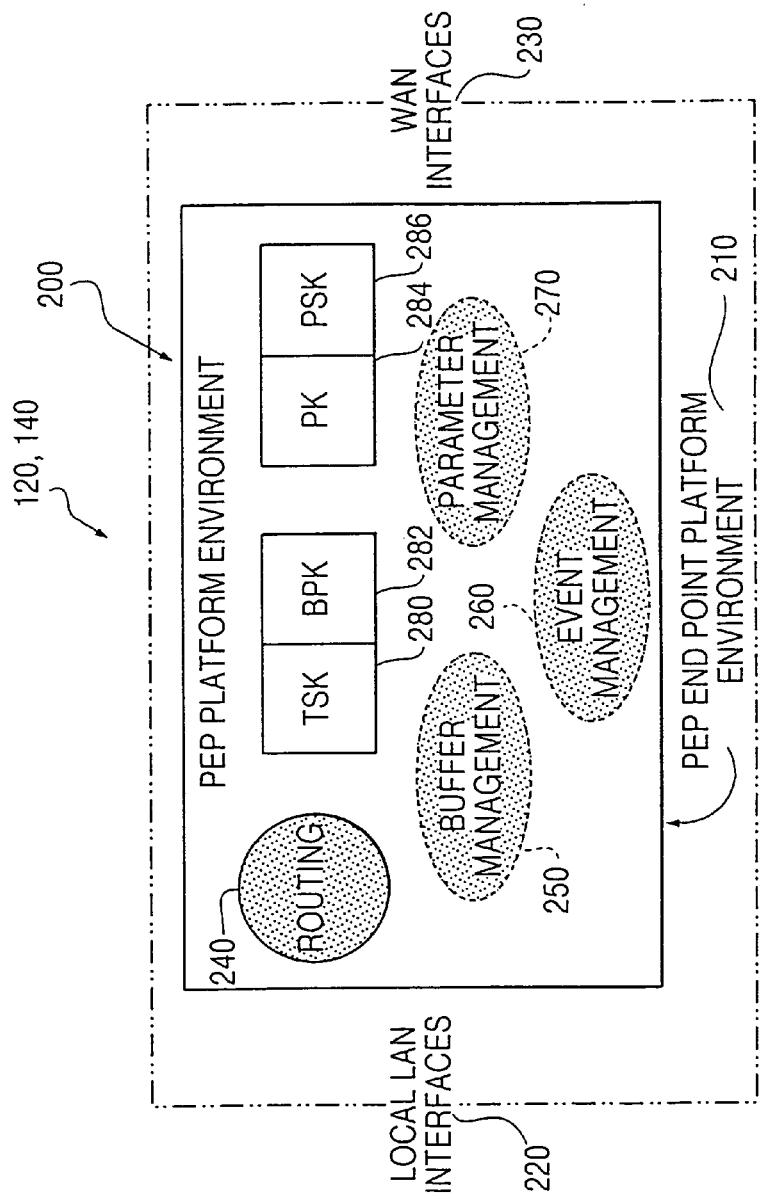
FIG. 4 illustrates an exemplary embodiment of a performance enhancing proxy (PEP), in one exemplary embodiment of the present invention.

FIG. 4 illustrates an exemplary embodiment of a performance enhancing proxy 200, the functionality of which can be implemented in a network gateway 120, 140 in one exemplary embodiment. The PEP 200 includes a platform environment 210, which includes the hardware and software operating system. The PEP 200 also includes local area network (LAN) interfaces 220 and wide area network (WAN) interfaces 230. In the example in FIG. 3, the network gateway 120 may establish the TCP connections with the IP hosts 110, via a local LAN interface 220 and may establish the backbone connection with the network gateway 140 via a WAN interface 230. The PEP platform environment 210 may also include general elements which perform the functions of routing 240, buffer management 250, event management 260, and parameter management 270. As illustrated in FIG. 4, the network gateway also includes a TCP spoofing kernel (TSK) 280, a backbone protocol kernel (BPK) 282, a prioritization kernel (PK) 284, and a path selection kernel (PSK) 286. These four kernels essentially make up the functionality of the performance enhancing proxy 200.

The platform environment 210 has at least three purposes. These include performing functions that the various PEP kernels 280, 282, 284, 286 cannot perform directly because the implementation of the function is platform specific. This arrangement has the advantageous effect of hiding platform specific details from the PEP kernels 280, 282, 284, 286. An example of a platform specific function is the allocation of a buffer. In some platforms, buffers are allocated, while in other platforms, buffers are created at start-up and organized into linked lists. It is noted that platform specific functions are not limited to functions generic to all of the kernels 280, 282, 284, 286.

The second purpose of the platform environment 210 is to provide the task context in which the PEP kernels 280, 282, 284, 286 run. In one exemplary embodiment, all PEP kernels 280, 282, 284, 286 can run in the same task context for efficiency, but this is not required.

The third purpose of the platform environment 210 is to provide an interface between the PEP functionality (embodied in kernels 280, 282, 284, 286) and the other functionality of the network gateway 120, 140. For example, the platform environment 210 may provide the interface between the PEP functionality and the routing function 240 illustrated in FIG. 4. It is noted that the platform specific functions illustrated in FIG. 4 are examples and are not considered an exhaustive list. It is further noted that the PEP kernels shown touching each other (280, 282 and 284, 286) in FIG. 4 may have a direct procedural interface to each other. Further, the kernels 280, 282, 284, 286 may include direct interfaces, as opposed to routing everything through the platform environment 210 (as shown in FIG. 4), in order to improve performance.

Figure 1:
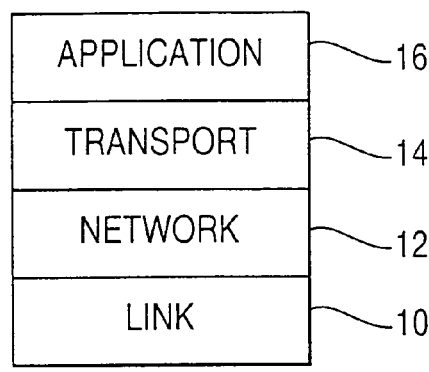
FIG. 1 illustrates the four layers of the conventional TCP/IP protocol suite.
Figure 2:
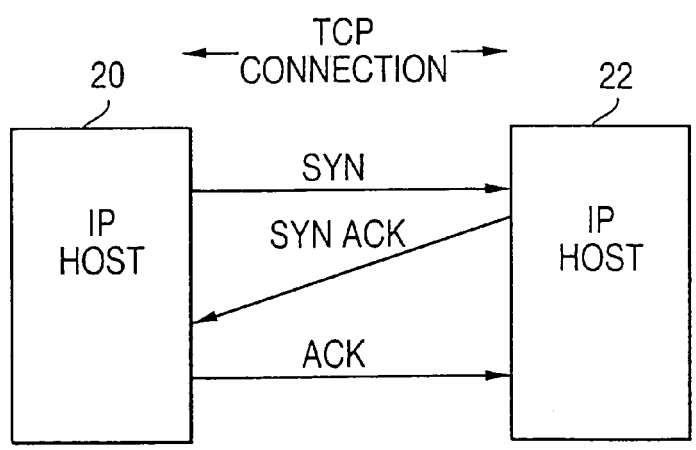
FIG. 2 illustrates an example of the conventional TCP three-way handshake between IP hosts.
Figure 5:
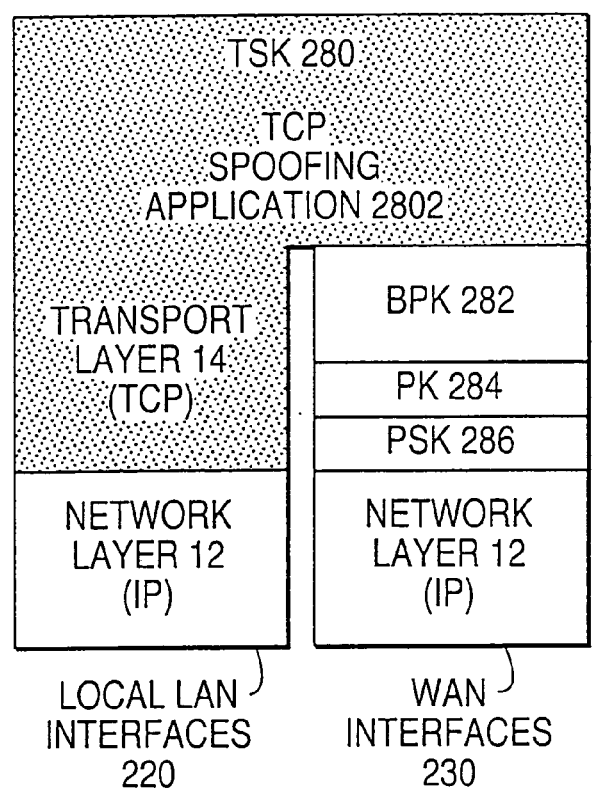
FIG. 5 illustrates an exemplary stack, which describes the relationship between the conventional TCP stack and the PEP kernels, in one exemplary embodiment of the present invention.

FIG. 5 is an exemplary stack, which illustrates the relationship between the TCP stack and the PEP kernels 280, 282, 284, 286 of the present invention. The TSK 280 is primarily responsible for functions related to TCP spoofing. The TSK 280 includes at least two basic elements, the conventional transport layer 14 of the TCP/IP stack (such as the transport layer 14 illustrated in FIG. 1) and a TCP spoofing application 2802. The transport layer 14 is responsible for interacting with the TCP stacks of IP hosts 110 connected to a PEP's local LAN interface 220. The TSK 280 implements the TCP protocol including the appropriate TCP state machines and terminates spoofed TCP connections. The TCP spoofing application 2802 can sit on top of the transport layer 14 and act as the application receiving data from and sending data to the IP hosts 110 applications. The TCP spoofing application 2802 can hide the details of TCP spoofing from the transport layer 14, allowing the transport layer 14 to function as much like a standard transport layer 14 as possible. The TCP spoofing application 2802 can also interface to the BPK 282.

The PK 284 is responsible for determining the priority of IP packets and then allocating transmission opportunities based on priority. The PK 284 can also control access to buffer space by controlling the queue sizes associated with sending and receiving IP packets.

The PSK 286 determines which path an IP packet should take to reach its destination. The path selected by the PSK 286 can be determined applying path selection rules. PSK 286 may also determine which IP packet should be forwarded using an alternate path and which packets should be dropped when one or more primary paths fail.

The BPK 282 performs backbone protocol maintenance and is the protocol by which the network gateways 120, 140 in FIG. 3 communicate. The BPK 282 provides reliable delivery of data, uses a relatively small amount of acknowledgement traffic, and supports generic backbone use (i.e., use not specific to the TSK 280). One such example is the reliable data protocol (RDP).

Figure 6:
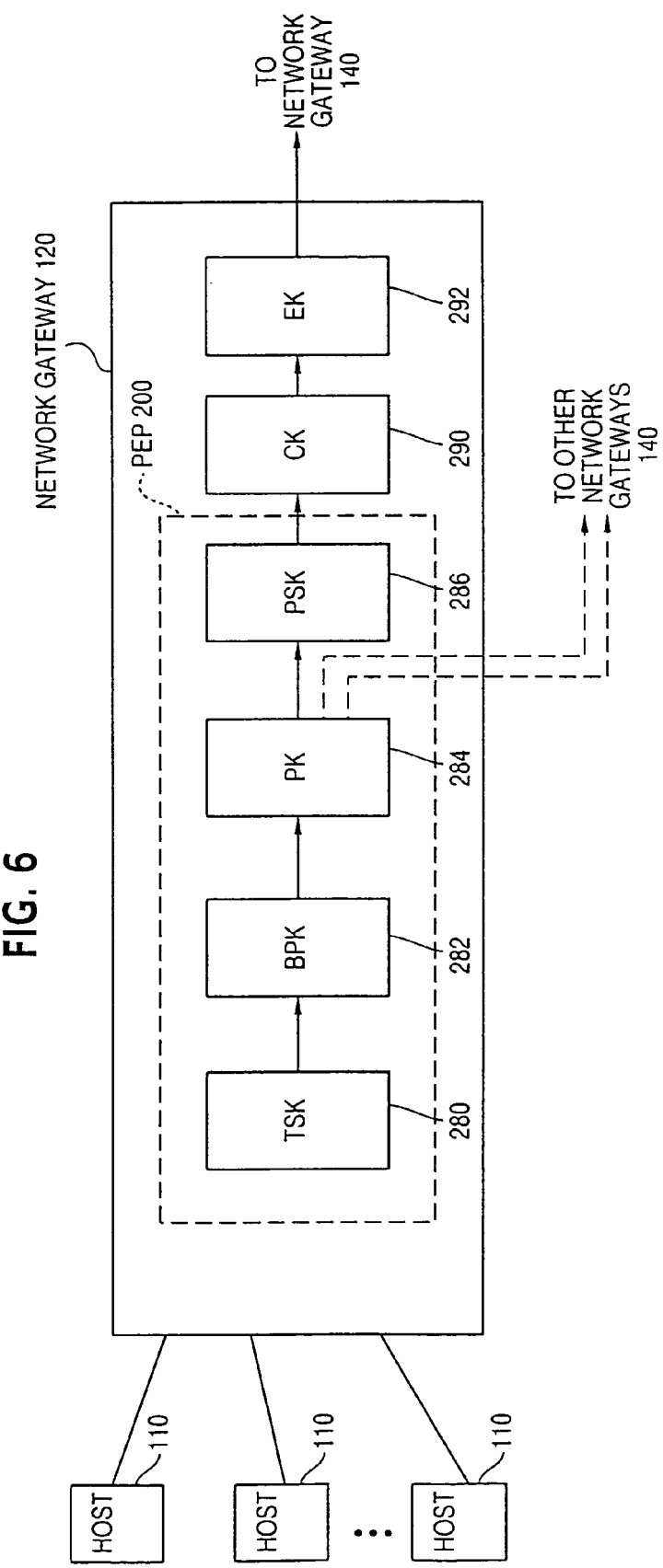
FIG. 6 illustrates the PEP kernels in one exemplary embodiment of the present invention

FIG. 6 illustrate the PEP kernels 280, 282, 284, and 286 as well as other kernels such as a data compression kernel 290 and an encryption kernel 292. As described above, the PEP kernels 280, 282, 284, and 286 facilitate communication between the two groups of hosts 110, 150, by performing a variety of performance enhancing functions, either singly or in combination. These performance enhancing functions are described in more detail below.

Selective TCP Spoofing

Selective TCP Spoofing is performed by the TSK 280 and includes a set of user configurable rules that are used to determine which TCP connections should be spoofed. Selective TCP spoofing improves performance by not tying up TCP spoofing-related resources, such as buffer space, control blocks, etc., for TCP connections for which the user has determined that spoofing is not beneficial or required.

In particularly, the TSK 280 discriminates among the various TCP connections based on the applications using them. TCP spoofing is then performed only for those TCP connections that are associated with applications for which high throughput or reduced connection startup latency (or both) is required. As a result, the TSK 280 conserves TCP spoofing resources for only those TCP connections for which high throughput or reduced connection startup latency (or both) is required. Further, the TSK 280 increases the total number of TCP connections which can be active before running out of TCP spoofing resources, since any active TCP connections which do not require high throughput are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TSK 280. The TSK 280 is also re-configurable to allow a user or operator to reconfigure the TCP port numbers which should and should not be spoofed. The TSK 280 also permits a user or operator to control which TCP connections are to be spoofed based on other criteria. In general, a decision on whether to spoof a TCP connection may be based on any field within a TCP packet. The TSK 280 permits a user to specify which fields to examine and which values in these fields identify TCP connections that should or should not be spoofed. Another example of a potential use for this capability for the user or operator to select the IP address of the TCP packet in order to control for which users TCP spoofing is performed. The TSK 280 also permits a user to look at multiple fields at the same time. As a result, the TSK 280 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule:

Destination IP address;
Source IP address;
TCP port numbers (which may apply to both the TCP destination and source port numbers);
TCP options; and
IP differentiated services (DS) field.

As outlined above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the TSK 280 can apply rules in the order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assume enough buffer space has been allocated to spoof five (5) TCP connections. If four (4) low speed applications (i.e. applications which, by their nature, do not require high speed) bring up connections along with one high speed application, the high speed connection has access to only ⅕ of the available spoofing buffer space. Further, if five (5) low speed connections are brought up before the high speed connection, the high speed connection cannot be spoofed at all. Using the TSK 280 selective spoofing mechanism, the low speed connections are not allocated any spoofing buffer space. Therefore, the high speed connection always has access to all of the buffer space, improving its performance with respect to an implementation without the selective TCP spoofing feature of the TSK 280.

Three-Way Handshake Spoofing

The TSK 280 also facilitates spoofing of the conventional three-way handshake. Three-Way Handshake Spoofing involves locally responding to a connection request to bring up a TCP connection in parallel with forwarding the connection requests across the backbone link 130. This allows the originating IP host (for example, 110) to reach the point of being able to send the data it must send at local speeds, i.e. speeds that are independent of the latency of the backbone link 130. Three-way Handshake Spoofing allows the data that the IP host 110 needs to send to be sent to the destination IP host 150 without waiting for the end-to-end establishment of the TCP connection. For backbone links 130 with high latency, this significantly reduces the time it takes to bring up the TCP connection and, more importantly, the overall time it takes to get a response (from an IP host 150) to the data the IP host 110 sends.

A specific example where this technique is useful relates to an Internet web page access application. With three-way handshake spoofing, an IP host's request to retrieve a web page can be on its way to a web server without waiting for the end-to-end establishment of the TCP connection, thereby reducing the time it takes to download the web page.

Local Data Acknowledgement

With Local Data Acknowledgement, the TSK in the network gateway 120 (for example) locally acknowledges data segments received from the IP host 110. This allows the sending IP host 110 to send additional data immediately. More importantly, TCP uses received acknowledgements as signals for increasing the current TCP window size. As a result, local sending of the acknowledgements allows the sending IP host 110 to increase it TCP window at a much faster rate than supported by end to end TCP acknowledgements. The TSK 280 (the spoofer) takes on the responsibility for reliable delivery of the data which it has acknowledged.

TCP Connection to Backbone Connection Multiplexing

In the BPK 282, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link 130. In addition, the BPK 282 selects a backbone connection protocol that is optimized to provide high throughput for the particular link. Different backbone connection protocols can be used by the BPK 282 with different backbone links without changing the fundamental TCP spoofing implementation. The backbone connection protocol selected by the BPK 282 provides appropriate support for reliable, high speed delivery of data over the backbone link 130, hiding the details of the impairments (for example high latency) of the link from the TCP spoofing implementation.

The multiplexing by the BPK 282 allows for the use of a backbone link protocol which is individually tailored for use with the particular link and provides a technique to leverage the performance of the backbone link protocol with much less dependency upon the individual performance of the TCP connections being spoofed than conventional methods.

Further, the ability to tailor the backbone protocol for different backbone links makes the present invention applicable to many different systems. These include multimedia networks such as the DirecWay™ Multimedia Network, the Integrated Satellite Business Networks™ (ISBN™), other types of VSAT Networks, and TDMA Networks.

Data Compression/Encryption

The PEP 200 may also include a data compression kernel 290 for compressing TCP data and an encryption kernel 292 for encrypting TCP data. Data compression increases the amount of data that can be carried across the backbone connection. Different compression algorithms can be supported by the data compression kernel 290 and more than one type of compression can be supported at the same time. The data compression kernel 290 may optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Exemplary data compression algorithms are disclosed in U.S. Pat. Nos. 5,973,630, 5,955,976, the entire contents of which are hereby incorporated by reference. The encryption kernel 292 encrypts the TCP data for secure transmission across the backbone link 130. Encryption may be performed by any conventional technique. It is also understood that the corresponding spoofer (in the example outlined above, the network gateway 140) includes appropriate kernels for decompression and decryption, both of which may be performed by any conventional technique.

Prioritization

The PK 284 provides prioritized access to the backbone link 130 capacity. For example, the backbone connection can actually be divided into N (N>1) different sub-connections, each having a different priority level. In one exemplary embodiment, four priority levels can be supported. The PK 284 uses user-defined rules to assign different priorities, and therefore different sub-connections of the backbone connection, to different TCP connections. The PK 284 also uses user-defined rules to control how much of the backbone link 130 capacity is available to each priority level. There are at least six criteria which can be used to determine priority:

Destination IP address;
Source IP address;
IP next protocol;
TCP port numbers (which may apply to both the TCP destination and source port numbers);
UDP port numbers (which may apply to both the UDP destination and source port numbers); and
IP differentiated services (DS) field.

The type of data in the TCP data packets may also be used as a criterion. For example, video data could be given highest priority. Mission critical data could also be given high priority.

As outlined above, in addition to supporting selective prioritization rules for each of these criteria, AND and OR combination operators can be used to link criteria together. For example, using the AND combination operator, a rule can be defined to assign a priority for FTP data received from a specific host. Also, the order in which the rules are specified may be significant. It is possible for a connection to match the criteria of multiple rules. Therefore, the PK 284 can apply rules in the order specified by the operator, taking the action of the first rule that matches. A default rule may also be set which defines the action to be taken for TCP connections which do not match any of the defined rules. The set of rules selected by the operator may be defined in a prioritization profile.

Path Selection

The PSK 286 is responsible for determining which path an IP packet should take to reach its destination. The path selected by the PSK 286 can be determined by applying path selection rules. The PSK 286 also determines which IP packets should be forwarded using an alternate path and which IP packets should be dropped when one or more primary paths fail. Path selection parameters can also be configured using profiles. The path selection rules may be designed to provide flexibility with respect to assigning paths while making sure that all of the packets related to the same traffic flow (e.g., the same TCP connection) take the same path (although it is also possible to send segments of the same TCP connection via different paths, this segment "splitting" may have negative side effects). There are at least seven criteria which can be used to select a path:
  priority of the IP packet as set by the PK 284 (should be the most common criterion)
  Destination IP address;
  Source IP address;
  IP next protocol;
  TCP port numbers (which may apply to both the TCP destination and source port numbers);
  UDP port numbers (which may apply to both the UDP destination and source port numbers); and
  IP differentiated services (DS) field.

As outlined above, in addition to supporting path selection rules for each of these criteria, AND and OR combination operators can be used to link criteria together. For example, using the AND combination operator, a rule can be defined to select a path for FTP data received from a specific host. Also, the order in which the rules are specified may be significant. It is possible for a connection to match the criteria of multiple rules. Therefore, the PSK 286 can apply rules in the order specified by the operator, taking the action of the first rule that matches. A default rule may also be set which defines the action to be taken for TCP connections which do not match any of the defined rules. The set of rules selected by the operator may be defined in a path selection profile.

A path selection rule may select the following path information:
  the primary path for any IP packets which match the rule. A primary path should be specified in any path selection rule (including the default rule, discussed below);
  the secondary path for any IP packets which match the rule. The secondary path should only be used when the primary path has failed. If no secondary path is specified, any IP packets which match the rule can be discarded when the primary path fails; and
  the tertiary path for any IP packets which match the rule. A tertiary path should only be specified if a secondary path is specified. The tertiary path should only be used when both the primary and secondary paths have failed. If no tertiary path is specified, any IP packets which match the rule can be discarded when both the primary and secondary paths fail.

Path selection may be generalized such that the path selection rule can select up to N paths where the Nth path is used only if the (N−1)th path fails. The example above where N=3 is merely illustrative, although N is typically a fairly small number.

The operation of the entire network is described below in conjunction with FIGS. 3 and 6. First, a backbone connection is established between the PEPs 200 of two network gateways 120, 140 (the two spoofers), located at each end of the backbone link 130 for which TCP spoofing is desired. Whenever an IP host 110 initiates a TCP connection, the TSK 280 of the PEP 200 local to the IP host 110 checks its configured selective TCP spoofing rules. If the rules indicate that the connection should not be spoofed, the PEP 200 allows the TCP connection to flow end-to-end unspoofed. If the rules indicate that the connection should be spoofed, the spoofing PEP 200 locally responds to the IP host's TCP three-way handshake. In parallel, the spoofing PEP 200 sends a message across the backbone link 130 to its partner network gateway 140 asking it to initiate a TCP three-way handshake with the IP host 150 on its side of the backbone link 130. Data is then exchanged between the IP host 110, 150 with the PEP 200 of the network gateway 120 locally acknowledging the received data and forwarding it across the backbone link 130 via the high speed backbone connection, compressing the data as appropriate based on the configured compression rules. The priority of the TCP connection is determined when the connection is established. The BPK 282 can multiplex the connection with other received connections over a single backbone connection, the PK 284 determines the priority of the connection and the PSK determines the path the connection is to take.

In summary, the PEP 200 described above improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made.

Although the present invention has been described in conjunction with exemplary FIGS. 3-6, the present invention may be varied in many ways obvious to one of ordinary skill in the art. For instance, although the present invention describes spoofing some connections based on their associated applications, spoofs acknowledgements (ACKs), spoofing a three-way handshake, multiplexing multiple connections onto a single connection, prioritizing connections, performing path selection, compressing, encrypting data, any other performance enhancing function known to one of ordinary skill in the art could also be implemented.

Similarly, although the various parameters discussed above in conjunction with FIGS. 3-6 include destination address, source address, destination port number, source port number, options, a differentiated services (DS) field, protocol, a differentiated services (DS) field, a type of data contained therein, and priority of the connection or combinations thereof, any other parameters known to one of ordinary skill in the art could also be utilized.

Further, although the present invention has been described above using the TCP, TCP/IP, or UDP protocols, any high layer protocol known to one of ordinary skill in the art could also be utilized. Although the present invention has been described above in conjunction with a satellite link, any impaired link, that is any link with at least one potentially negative parameter (high latency, high bit error rate, etc.) could also benefit from the various performance enhancing features of the present invention. Although the various performance enhancing features of the present invention have been described as taking place within a network gateway, these functions could be performed within any network element, including, but not limited to, a host, a hub, a remote, and a router. Further, although the functionality described above in conjunction with the present invention has been described as being originally resident within a network element, the functionality may be added to an existing network element, via software loaded from an article of manufacture or software downloaded via a propagated signal.

What is claimed:
1. A network apparatus, comprising:
  a proxy which facilitates communication with other network entities by performing at least one performance enhancing function, the proxy communicating with the other network entities via a first type of connection and a second type of connection,
  wherein the proxy establishes multiple connections of the first type associated with different applications, and includes a spoofing element configured to intercept and alter a data flow within one of the connections to add to or delete from the data flow to reduce startup latency, the spoofing element only spoofing connections of the first type associated with at least one of applications with high throughput and applications for which reduced startup latency is desired, and a multiplexing element configured to selectively multiplex the spoofed connections onto a single connection of the second type.

2. The network apparatus of claim 1, wherein said spoofing element assigns spoofing resources, including buffer space and control blocks, to the spoofed connections.

3. The network apparatus of claim 1, wherein said spoofing element spoofs connections using at least one spoofing rule based on destination address, source address, destination port number, source port number, options, a differentiated services (DS) field or combinations thereof.

4. The network apparatus of claim 3, wherein said spoofing element defines the at least one spoofing rule in a spoofing profile.

5. The network apparatus of claim 1, wherein the spoofing element spoofs acknowledgements (ACKs).

6. The network apparatus of claim 1, wherein the spoofing element spoofs a three-way handshake between said network apparatus and another network entity.

7. The network apparatus of claim 1, wherein the proxy includes a prioritization element, which prioritizes connections of the first type to determine what priority level of the connection of the second type, each of the connections of the first type are assigned.

8. The network apparatus of claim 7, wherein said prioritizing element prioritizes connections using at least one prioritizing rule based on destination address, source address, destination port number, source port number, protocol, a differentiated services (DS) field, a type of data contained within the connection or combinations thereof.

9. The network apparatus of claim 8, wherein said prioritizing element defines the at least one prioritizing rule in a prioritizing profile.

10. The network apparatus of claim 1, wherein the proxy includes a path selection element, which selects a path for data associated with connections of the first type across connections of the second type or connections of other types.

11. The network apparatus of claim 10, wherein said path selection element can select up to N paths (N>1), where the Nth path is selected only if the (N−1)th path fails.

12. The network apparatus of claim 11, wherein said path selection element selects a path using at least one path selection rule based on priority, a destination address, source address, destination port number, source port number, protocol, a differentiated services (DS) field or combinations thereof.

13. The network apparatus of claim 12, wherein said path selection element defines the at least one path selection rule in a path selection profile.

14. The network apparatus of claim 1, wherein the proxy includes a compression and encryption element, which compresses and encrypts data associated with connections of the first type for transmission across connections of the second type.

15. The network apparatus of claim 1, wherein the first connection uses a high layer protocol.

16. The network apparatus of claim 1, wherein the first connection uses one of the Transmission Control Protocol (TCP) and the User Datagram Protocol (UDP).

17. The network apparatus of claim 1, wherein the second connection is a backbone connection.

18. The network apparatus of claim 1, wherein the backbone connection is via a wireless link.

19. The network apparatus of claim 18, wherein the wireless link has high latency and high error rate.

20. The network apparatus of claim 18, wherein the wireless link is a satellite link.

21. The network apparatus of claim 1, wherein said network apparatus is a component of a network gateway.

22. The network apparatus of claim 1, wherein said network apparatus is a component of a host.

23. The network apparatus of claim 1, wherein said network apparatus is a component of a hub.

24. The network apparatus of claim 1, wherein said network apparatus is a component of a VSAT.

25. The network apparatus of claim 1, wherein said network apparatus is a component of a router.

26. A method for providing data communication with a plurality of network entities, comprising:

facilitating communication with the network entities by performing at least one performance enhancing function;

communicating with the network entities via a first type of connection and a second type of connection;

establishing multiple connections of the first type associated with different applications;

intercepting and altering a data flow within one of the connections to add to or delete from the data flow to reduce startup latency;

spoofing only connections of the first type associated with at least one of applications with high throughput and applications for which reduced startup latency is desired; and selectively multiplexing the spoofed connections onto a single connection of the second type.

27. The method of claim 26, wherein said spoofing step assigns spoofing resources, including buffer space and control blocks, to the spoofed connections.

28. The method of claim 26, wherein said spoofing step spoofs connections using at least one spoofing rule based on destination address, source address, destination port number, source port number, options, a differentiated services (DS) field or combinations thereof.

29. The method of claim 28, wherein said spoofing step defines the at least one spoofing rule in a spoofing profile.

30. The method of claim 26, further comprising:
spoofing acknowledgements (ACKs).

31. The method of claim 26, further comprising:
spoofing a three-way handshake another network entity.

32. The method of claim 26, further comprising:
prioritizing connections of the first type to determine what priority level of the connection of the second type, each of the connections of the first type are assigned.

33. The method of claim 32, wherein said prioritizing step prioritizes connections using at least one priority rule based on destination address, source address, destination port number, source port number, protocol, a differentiated services (DS) field, type of data contained within the connection or combinations thereof.

34. The network apparatus of claim 33, wherein said prioritizing element defines the at least one prioritizing rule in a prioritizing profile.

35. The method of claim 26, further comprising:
selecting a path for data associated with connections of the first type across connections of the second type or connections of other types.

36. The method of claim 35, wherein said selection step selects up to N paths (N>1), where the Nth path is selected only if the (N−1)th path fails.

37. The method of claim 36, wherein said selection step selects a path using at least one path selection rule based on priority, a destination address, source address, destination port number, source port number, protocol, a differentiated services (DS) field or combinations thereof.

38. The method of claim 37, wherein said selection step defines the at least one path selection rule in a path selection profile.

39. The method of claim 26, further comprising:
compressing and encrypting data associated with connections of the first type for transmission across connections of the second type.

40. The method of claim 26, wherein the first connection uses a high layer protocol.

41. The method of claim 26, wherein the first connection uses one of the Transmission Control Protocol (TCP) and the User Datagram Protocol (UDP).

42. The method of claim 26, wherein the second connection is a backbone connection.

43. The method of claim 42, wherein the backbone connection is via a wireless link.

44. The method of claim 26, wherein the wireless link has high latency and high error rate.

45. The method of claim 26, wherein the wireless link is a satellite link.

46. The method of claim 26, wherein said method is performed in a network gateway.

47. The method of claim 26, wherein said method is performed in a host.

48. The method of claim 26, wherein said method is performed in a hub.

49. The method of claim 26, wherein said method is performed in a VSAT.

50. The method of claim 26, wherein said method is performed in a router.

51. The method of claim 26, wherein said method is performed in a switch.

52. A method for providing data communication over a satellite network, the method comprising:
communicating with a plurality of hosts over a plurality of connections corresponding to a plurality of applications resident on the respective hosts;
determining which of the plurality of connections, according to the respective applications, is to receive priority processing for transport over a backbone connection established over the satellite network;
encrypting and compressing data streams associated with the priority connections based on a transmission constraint of the backbone connection; and
transmitting the encrypted and compressed data streams over the backbone connection, and concurrently acknowledging the corresponding hosts.

53. A computer-readable medium bearing instructions for providing data communication over a satellite network, said instruction, being arranged, upon execution, to cause one or more processors to perform the method of claim 52.

* * * * *